US012731055B2

(12) United States Patent
Li et al.

(10) Patent No.: US 12,731,055 B2
(45) Date of Patent: Sep. 8, 2026

(54) PREDICTIVE FUZZY PID CONTROL METHOD FOR INTELLIGENT GREENHOUSE

(71) Applicant: Yunnan Agricultural University, Kunming (CN)

(72) Inventors: Wenfeng Li, Kunming (CN); Nan Wang, Kunming (CN); Yue Huang, Kunming (CN); Bang Li, Kunming (CN); Jizhong He, Kunming (CN); Guodong Fu, Kunming (CN)

(73) Assignee: Yunnan Agricultural University, Kunming (CN)

( * ) Notice: Subject to any disclaimer, the term of this patent is extended or adjusted under 35 U.S.C. 154(b) by 0 days.

(21) Appl. No.: 19/290,393

(22) Filed: Aug. 5, 2025

(65) Prior Publication Data

US 2026/0050806 A1 Feb. 19, 2026

(30) Foreign Application Priority Data

Aug. 5, 2024 (CN) ......................... 202411063630.3

(51) Int. Cl.
*G06N 5/048* (2023.01)
*G05B 19/05* (2006.01)

(52) U.S. Cl.
CPC ............. *G06N 5/048* (2013.01); *G05B 19/05* (2013.01); *G05B 2219/13095* (2013.01)

(58) Field of Classification Search
None
See application file for complete search history.

(56) References Cited

PUBLICATIONS

Tang et al, "Analysis of temperature control system for strawberry greenhouse based on Smith predictive fuzzy PID", 2022, AHPCAI , pp. 328-332 (Year: 2022).*

Miranda et al, "Fuzzy Greenhouse Climate Control System based on a Field Programmable Gate Array", Apr. 2006, Automation and Emerging Technologies pp. 165-176 (Year: 2006).*

(Continued)

*Primary Examiner* — David Earl Ogg
(74) *Attorney, Agent, or Firm* — Bayramoglu Law Offices LLC

(57) ABSTRACT

A predictive fuzzy PID control method for an intelligent greenhouse includes: acquiring greenhouse real-time data, where the real-time data includes temperature data and humidity data; obtaining fuzzy quantity, control quantity and error data based on the real-time data, where the error data includes an error value and an error change rate; obtaining a target value based on the error data and a predictive functional control; controlling the target value and the error data for fuzzy inference, determining and adjusting parameters, and generating a control signal based on the parameters; and controlling greenhouse equipment adjustment based on the control signal to enable an output value of the equipment to approach the target value, and repeating the above steps to achieve continuous greenhouse environment control. This method achieves more accurate and efficient control of environmental parameters such as temperature, humidity, and illumination, and provides an optimal growing environment for plants.

5 Claims, 5 Drawing Sheets

(56) References Cited

PUBLICATIONS

Aghaseyedabdollah et al, “IoT Based Smart Greenhouse Design with an Intelligent Supervisory Fuzzy Optimized Controller”, 2021, 7th International Conference on Web Research, pp. 311-316 (Year: 2021).*

Jung et al, “Model Predictive Control via Output Feedback Neural Network for Improved Multi-Window Greenhouse Ventilation Control”, 2020, Sensors, pp. 1-16 (Year: 2020).*

* cited by examiner

PREDICTIVE FUZZY PID CONTROL METHOD FOR INTELLIGENT GREENHOUSE

CROSS REFERENCE TO THE RELATED APPLICATIONS

This application is based upon and claims priority to Chinese Patent Application No. 202411063630.3, filed on Aug. 5, 2024, the entire contents of which are incorporated herein by reference.

TECHNICAL FIELD

The present application relates to the field of intelligent measurement and control technology, and in particular, to a predictive fuzzy PID (proportional-integral-derivative) control method for an intelligent greenhouse.

BACKGROUND

As an advanced agricultural facility, a greenhouse has very important scientific and practical value. The greenhouse may adjust environmental conditions such as temperature, humidity, illumination, and $CO_2$ concentration according to different environmental requirements, so as to achieve precise planting management, so that the greenhouse occupies an important position in the field of current agricultural engineering and receives more and more attention. An intelligent greenhouse is an agricultural production method that uses automation technology and control systems to ensure that plants grow rapidly in the optimal growth environment by precisely controlling environmental parameters.

There are many factors that affect crop growth in the greenhouse environment. Ideally, a controller designed in the greenhouse may fully consider environmental variables and accurately meet the suitable environment required for crop growth. However, due to the nonlinear and time-lag characteristics of environmental variables and the coupling between environmental factors, the design of the controller becomes complicated and the control accuracy is reduced, resulting in a less than ideal greenhouse control effect. Among the environmental variables that affect crop growth, air temperature and air humidity are particularly prominent. Therefore, when a greenhouse intelligent controller is designed, the mutual influence and the regulatory relationship between air temperature and air humidity must be fully considered to ensure that the environmental quality in the greenhouse is effectively controlled.

At present, no greenhouse automatic control system has been developed that can meet diverse climate conditions in China, and the investment in imported systems from abroad is huge and the operating costs are very expensive. Due to the diversity of greenhouse structures and differences in actuators, the implementation of control plans needs to be highly targeted. The combination of a greenhouse environment physical model and a greenhouse environment factor control method is very important for optimization control research on the greenhouse.

SUMMARY

To resolve or partially resolve the problems in the related art, the present application provides a predictive fuzzy PID control method for an intelligent greenhouse, which achieves the tracking control of temperature and humidity based on an environment control mechanism modeling method and achieves the creation of a good growing environment for crops.

A first aspect of the present application provides a predictive fuzzy PID control method for an intelligent greenhouse, which is applied to a predictive fuzzy PID controller, wherein the predictive fuzzy PID controller includes a predictive functional control and a fuzzy PID controller, and the predictive fuzzy PID control method includes the following steps:

- acquiring greenhouse real-time data, wherein the real-time data comprises temperature data and humidity data;
- fuzzifying the real-time data to obtain fuzzy quantity, control quantity and error data, wherein the error data includes an error value and an error change rate;
- obtaining a target value based on the error data and the predictive functional control;
- controlling the target value and the error data for fuzzy inference, determining and adjusting parameters, and generating a control signal based on the parameters;
- controlling adjustment of a greenhouse device based on the control signal to enable an output value of the device to approach the target value; and
- repeating the above steps to achieve continuous greenhouse environment control.

The fuzzy PID controller includes:

- variable fuzzification, configured to convert input variables and output variables into fuzzy sets, wherein the fuzzy sets include "low temperature", "moderate temperature" and "high temperature", "low humidity", "moderate humidity" and "high humidity";
- a knowledge base, configured to store a fuzzy rule and a membership function and provide support for the fuzzy inference;
- fuzzy inference, configured to, based on the fuzzy rules and a membership of the input variables, determine a fuzzy set of the output variables by a fuzzy inference engine, and calculate a fuzzy set of the output variables;
- a defuzzification interface, configured to, based on a maximum membership method, convert the fuzzy output set into a specific control signal, wherein the control signal is configured to control devices of the greenhouse; and
- online parameter adjustment, configured to, through a fuzzy control rule and a fuzzification result of the input variables, according to a preset benchmark parameter, adjust parameters of the PID controller in real time to adapt to different control requirements and changing environments.

The predictive functional control implements predictive control based on elements, the elements include a basis function, a reference trajectory, a predictive model, feedback correction and rolling optimization, the basis function provides a basis for expression of a control strategy, the reference trajectory indicates a control objective, the predictive model performs future state prediction, the feedback correction corrects a prediction error, and the rolling optimization continuously adjusts the control strategy based on real-time information.

The basis function is represented as:

$$u(K+i)=\sum_{j=1}^{N}\mu_j(K)f(i)$$

wherein N is an order of the basis function, $u_j(K)$ is a linear combination weight coefficient of the basis function, and $f_j(i)$ is a value of the basis function at an i-th sampling period.

When the basis function is in a form of a step, a ramp, or a parabola, values of the basis functions in each sampling period is represented as: a step function $f_j(i)=step(i-k)$, a ramp function $f_j(i)=max(0, i-k)$, and a parabola function $f_j(i)=max(0, (i-k)^2)$ wherein k is a center position of the basis function, and the values of the basis functions are as follows:

$$f = \begin{pmatrix} 1 & 0 & \dots & 0 \\ 1 & 1 & \dots & 1 \\ 1 & 2 & \dots & 2^{N-1} \\ \vdots & \vdots & \dots & \vdots \\ 1 & h_s & \dots & H_S^{N-1} \end{pmatrix}_{(h_s+1)N}$$

$$f_j(i) = F(i, j).$$

wherein S is a number of fitting points, $h_s$ is an s-th fitting point moment, and F takes a sampling period T as a unit.

The reference trajectory compares the output value of the device with the target value, and limits and adjusts the output value of the device to ensure that the output value of the device approaches the target value and remains stable, and a reference trajectory at a moment k+i is represented as:

$$Y_r(k+i) = C(k) - \lambda^I(C(k) - Y_p(k))$$

$$C(K) = [c_1(k), \dots, c_n(k)]^T$$

$$\lambda^I = e\frac{-T_s}{T_m}$$

$$Y_P(K) = [y_{p1}(k), \dots \dots, y_{pn}(k)]^T$$

wherein C(K) is a set value at a moment K, $T_s$ is a sampling time, $T_m$ is a desired reaction time of a reference trajectory n, and $Y_p(K)$ is an actual output of an n-th input at the moment K.

The predictive model is implemented based on a dynamic matrix algorithm, an output value of an object in the future is predicted by a model parameter $\{a_i\}$ of a system in the dynamic matrix algorithm, and an output value formula at a future moment is:

$$\tilde{y}_1\left(k+\frac{i}{k}\right) = \tilde{y}_0\left(k+\frac{i}{k}\right) + a_i\Delta u(k), \quad i = 1, \dots., N$$

under the action of M continuous control increments $\Delta_u(k)$, . . . , $\Delta_u(K+M-1)$, an output value at each moment in the future is predicted:

$$\tilde{y}_m\left(k+\frac{i}{k}\right) = \tilde{y}_0\left(k+\frac{i}{k}\right) + \sum_{j=1}^{\min(M,i)} a_{i-j+1}\Delta\, u(K+M-1),\ i = 1, \dots, N$$

wherein y is a number of times the control quantity changes, and $$\left(k+\frac{i}{k}\right)$$

is a predicted value at the moment k to the moment k+i.

In the determination and adjustment of parameters, the parameters are PID parameters, and the principle of the PID parameters is: determining a proportional gain, an integral gain, and a differential gain according to a size of the error, a size of an error change rate and a system requirement.

The adjusting PID parameters include:

controlling a deviation e and a deviation derivative ec for fuzzifying;

calculating reference parameters $\Delta K_p$, $\Delta K_i$ and $\Delta K_d$ according to a fuzzy control rule table; and obtaining final control parameters according to initial parameters $\Delta K_{p0}$, $\Delta K_{i0}$ and $\Delta K_{d0}$ and the reference parameters, wherein the formula is as follows:

$$\begin{cases} K_p = K_{p0} + \Delta K_p \\ K_i = K_{i0} + \Delta K_i \\ K_d = K_{d0} + \Delta K_d \end{cases}.$$

The controlling the target value and the error data for fuzzy inference is implemented based on a fuzzy rule, and the fuzzy rules constitute a fuzzy rule control table based on a basic control criterion, a PID parameter self-tuning rule, and expert experience.

The technical solution provided by the present application may have the following beneficial effects:

The present application provides a predictive fuzzy PID control method for an intelligent greenhouse, which combines fuzzy control and prediction control, gives full play to the advantages of the fuzzy control and the prediction control, achieves more accurate and efficient control of environmental parameters such as temperature, humidity, and illumination in a control system, provides an optimal growing environment for plants, thereby improving the quality and yield of agricultural products, relieving the influence of climate change on agricultural production to a certain extent, providing a stable production environment, conforming to the concept of sustainable agriculture, and achieving the sustainable development of agricultural production.

It should be understood that the foregoing general description and the following detailed description are exemplary and explanatory only and are not restrictive of the present application.

BRIEF DESCRIPTION OF THE DRAWINGS

The above and other objectives, features and advantages of the present application will become more apparent through a more detailed description of exemplary embodiments of the present application in conjunction with the accompanying drawings, wherein the same reference numerals generally represent the same components in the exemplary embodiments of the present application.

DETAILED DESCRIPTION OF THE EMBODIMENTS

Figure 1:
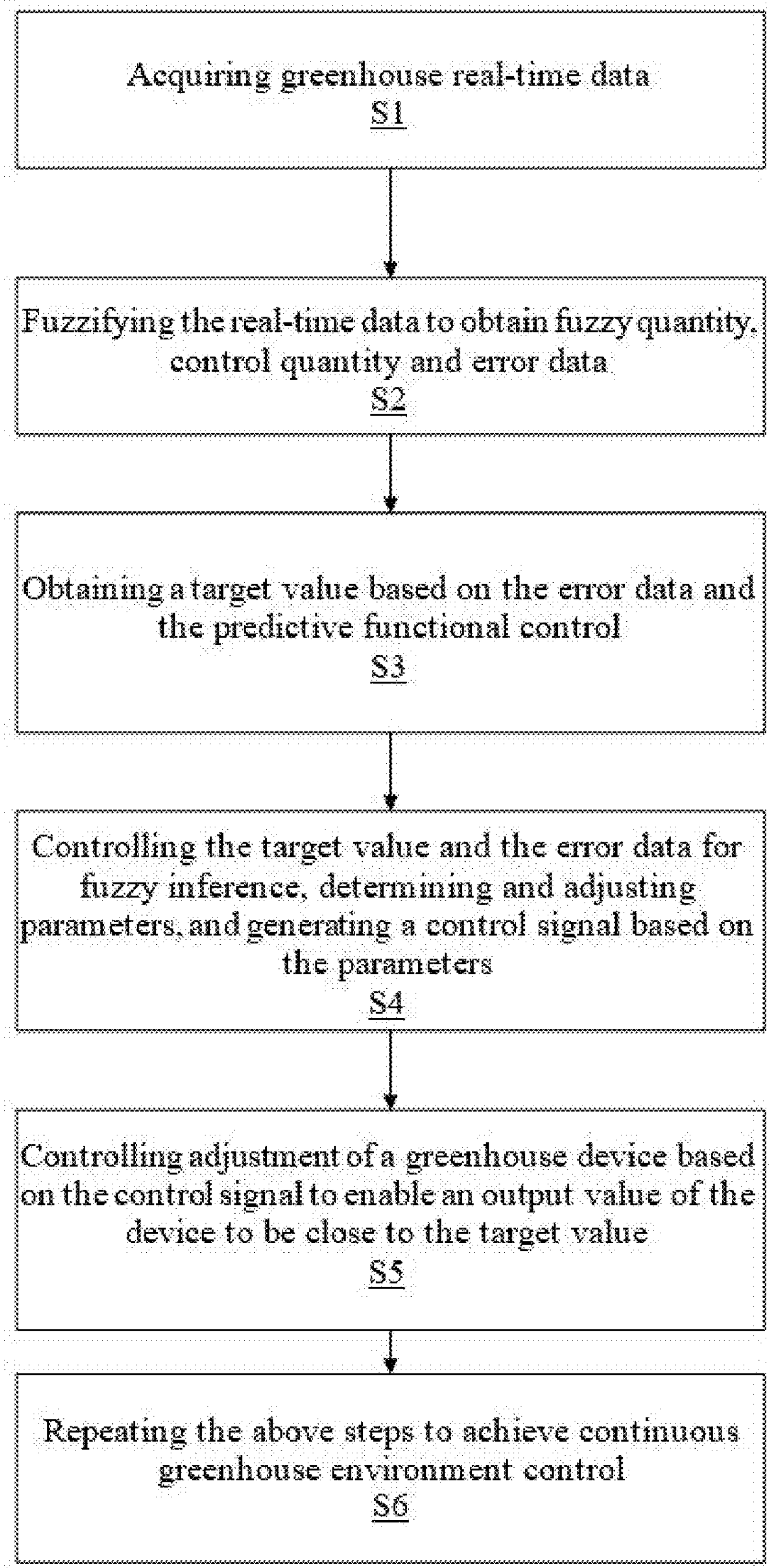
FIG. 1 is a schematic flowchart of a predictive fuzzy PID control method according to the present application.

Embodiments of the present application will be described in more detail below with reference to the accompanying drawings. Although the embodiments of the present application are shown in the accompanying drawings, it should be understood that the present application may be implemented in various forms and should not be limited to the embodiments set forth herein. Rather, these embodiments are provided to make the present application more thorough and complete, and to fully convey the scope of the present application to those skilled in the art.

It should be understood that although the terms "first", "second", "third", and the like may be used in the present application to describe various information, the information should not be limited to these terms. These terms are only used to distinguish the same type of information from each other. For example, first information may also be referred to as second information, and similarly, second information may also be referred to as first information, without departing from the scope of the present application. Therefore, a feature defined with "first" or "second" may explicitly or implicitly include one or more features. In the description of the present application, "a plurality of" means two or more unless specifically limited otherwise.

In the description of the present application, it should be understood that directions or positional relationships indicated by terms "length", "width", "upper", "lower", "front", "rear", "left", "right", "vertical", "horizontal", "top", "bottom", "inner", "outer" and the like are those shown based on the accompanying drawings, and are merely intended to facilitate and simplify description rather than indicate or imply that the indicated apparatus or element must have a specific direction and must be configured and operated according to the specific direction. Therefore, these directions or positional relationships should not be construed as limiting the present application.

Unless otherwise specified and limited, the terms such as "mount", "link", "connect", and "fasten" should be understood broadly. For example, the term "connect" may be a fixed connection, may be a detachable connection, or may be integration; may be a mechanical connection or may be an electrical connection; or may be a direct connection, may be an indirect connection implemented by using an intermediate medium, or may be communication inside two elements or an interaction relationship between two elements. Those of ordinary skill in the art may understand specific meanings of the foregoing terms in the present application according to specific cases.

The technical solution of the embodiments of the present application is described in detail below with reference to the accompanying drawings.

In the actual control of a greenhouse environment, there are various environmental factors disturbances, which makes it difficult for the control process to accurately match the model, resulting in errors between a target value and an actual value. Such errors may affect the performance of the controller, and therefore corresponding measures need to be taken to address this problem.

Figure 2:
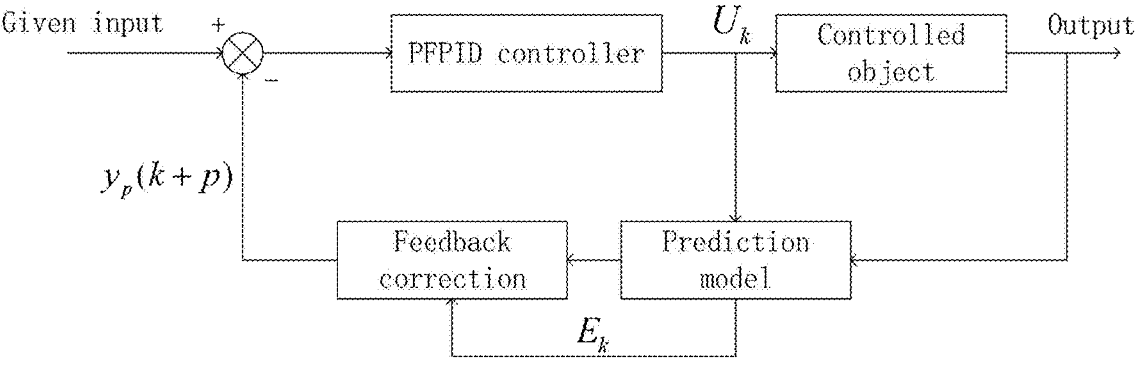
FIG. 2 is a block diagram of predictive fuzzy PID control of a predictive fuzzy PID control method according to the present application.

Referring to FIG. 2, an output value at time k is predicted by a model, so that the output follows a target set point. A difference between a predicted output YP(k+P) at k+P and the set point c is assumed to be an error e, which is obtained using a feedback correction method.

In controller design, the role of predictive functional control (PFC) is only to make predictions and does not participate in the actual control of the system. A predictive fuzzy controller requires that the control performance is related to the structure of the control input. In the predictive functional control (PFC), a control signal is expressed as a combination of a series of basic functions, such as a step function and a slope function. In this embodiment, a step function is selected, and a transfer function of the PFC prediction model used is a first-order model.

In the predictive fuzzy PID controller, the predictive functional control and the fuzzy PID controller cooperate with each other to achieve precise control of a controlled object by adjusting the parameters of the PID controller and calculating an optimal input value. When the output of the controlled object deviates from the target value, the prediction function model predicts a future output value and pass this future output value to the fuzzy PID controller, and the fuzzy PID controller then calculates a control quantity to make the controlled object approach the target value.

The predictive fuzzy PID control method for an intelligent greenhouse as shown in FIG. 1 is applied to a predictive fuzzy PID controller. The predictive fuzzy PID control method includes the following steps:

S1: Greenhouse real-time data is acquired, wherein the real-time data includes temperature data and humidity data.

Temperature and humidity, two major environmental factors, are taken as research objects, and the tracking and control of target values (temperature and humidity in the greenhouse) are achieved based on an environmental control mechanism modeling method. The purpose of effectively controlling the greenhouse environment is achieved through remote control of the actuator to create the optimal crop growth environment. The real-time temperature and humidity of the greenhouse are detected by sensors as input signals.

S2: The real-time data is fuzzified to obtain fuzzy quantity, control quantity and error data, wherein the error data includes an error value and an error change rate.

The real-time temperature and humidity data are fuzzified and converted into fuzzy quantities. The fuzzy controller processes the fuzzy quantities and obtains the corresponding control quantities through fuzzy inference. The output value of the future system is predicted using predictive control technology by calculating an optimal input value and an error and an error change rate between an actual input value and an expected input value. If the output of the controlled object differs from the target value, the prediction function model predicts the future output value.

S3: A target value is obtained based on the error data and the predictive functional control.

The prediction results and error data are passed to the fuzzy PID controller as input. The fuzzy PID controller adjusts the parameters of the PID controller by fuzzy logic inference to ensure that the system adjusts as expected. The fuzzy PID controller determines the final control quantity by using fuzzy logic inference, so as to achieve accurate control on the controlled object.

S4: The target value and the error data are controlled for fuzzy inference, parameters are determined and adjusted, and a control signal is generated based on the parameters.

The fuzzy PID controller calculates a final control quantity and applies the final control quantity to the controlled object to make the system output as close to the target value as possible. The control signal is sent to actuators to adjust devices in the greenhouse environment, such as heaters, coolers, and humidifiers, so that the system output is as close to the target value as possible.

S5: The adjustment of a greenhouse device is controlled based on the control signal to enable an output value of the device to approach the target value.

S6: The above steps are repeated to achieve continuous greenhouse environment control.

The fuzzy PID control adjusts the parameters of the PID controller through fuzzy logic inference. The fuzzy PID controller first fuzzifies the deviation e and the deviation derivative ec, and finds out the fuzzy relationship between the input variables e and ec, and then corrects the parameters of the PID controller by using the PID parameter correction values Δkp, Δki, and Δkd output by the fuzzy inference and defuzzification processes.

Compared with traditional PID controller, the fuzzy PID controller has better adaptability and robustness and has been widely used in many industrial fields. The fuzzy controller design includes the following processes:

(1) Fuzzification of Variables

Figure 4:
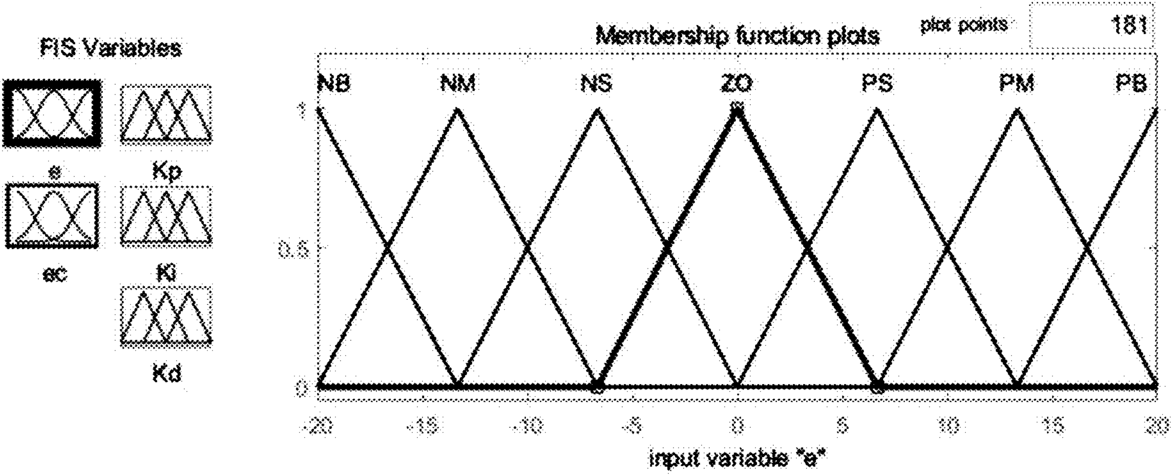
FIG. 4 is a schematic diagram of a fuzzy language subset membership function of a predictive fuzzy PID control method according to the present application.

Through experimental data or operating experience, the basic domains of input variable deviation e and deviation change rate ec and output variables $\Delta K_p$, $\Delta K_i$, $\Delta K_d$ are determined;

The fuzzy domains of input variables and output variables are determined and fuzzified into seven fuzzy subsets. Temperature and humidity have a very large interactive relationship. Generally, high temperature means low humidity, and low temperature means high humidity. The seven fuzzy subsets have the opposite effects on humidity. In the formulation of fuzzy rules, the relationship between temperature, humidity and carbon dioxide is taken into consideration to conduct comprehensive control of tracking values. Each fuzzy subset represents a degree or direction, including negative large, negative medium, negative small, zero, positive small, positive medium, and positive large. In this embodiment, Gaussian distribution is used as a membership function, and the editing function of the fuzzy designer in MATLAB is used to establish a fuzzy controller based on the input deviation and input deviation conversion rate inferred by Mamdani and the three outputs of $\Delta K_p$, $\Delta K_i$ and $\Delta K_d$. The seven fuzzy subsets designed are NB, NM, NS, O, PS, PM, and PB. Based on the above steps, an effective fuzzy controller as shown in FIG. 4 is established to achieve precise control of the controlled object.

(2) Principles of PID Parameters (a) When |e| is large, a relatively large proportional gain $K_p$ and a relatively small differential gain $K_d$ should be selected. Furthermore, to prevent the integral action from causing over-regulation, the integral gain $K_i$ is usually set to zero. This ensures that the system does not experience significant overshoot.

(b) When |e| is medium, to reduce the overshoot of the system and ensure the response speed of the system, a relatively small proportional gain $K_p$ should be selected. Meanwhile, the values of proportional gain $K_p$ and integral gain $K_i$ need to be appropriately selected to ensure that the system has a reasonable response speed. This allows the system to achieve a certain balance between control accuracy and dynamic performance.

(c) When the error |ec| is small, to ensure that the system has good steady-state performance, a relatively large proportional gain $K_p$ and integral gain $K_i$ should be selected. Meanwhile, it is necessary to select an appropriate differential gain $K_d$ value to ensure that the system has good stability near the set value. When the error |ec| is small, a slightly larger $K_d$ value should be selected, and when the error |ec| is large, a slightly smaller $K_d$ value should be selected. This allows the system to have reasonable stability within different error ranges and ensures that the system can quickly return to the set state.

(3) Establishment of Fuzzy Rules

The fuzzy rules are based on some basic control criteria and PID parameter self-tuning rules, and also combine the rich operating experience of control experts to form a fuzzy rule control table. The control rule table is designed and optimized according to the actual application scenario to ensure that the control system may maintain stability and robustness under various working conditions. By using these control rules, precise control of the controlled object may be achieved and the adaptability and flexibility of the control system may be improved, as shown in the following table. These rules provide guidance for the control of the devices, helping the system respond quickly to changes and maintain stable operation.

TABLE

Fuzzy rules of $\Delta K_p$, $\Delta K_i$ and $\Delta K_d$

| e | NB | | | NM | | | PB |
|---|---|---|---|---|---|---|---|
| NB | PB/NB/PS | PB/NB/NS | PM/NM/NB | PS/NM/NB | PS/NS/NB | O/O/NM | O/O/PS |
| NM | PB/NB/PS | PB/NB/NS | PM/NM/NB | PS/NS/NM | PS/NS/NM | O/O/NS | NS/O/O |
| NS | PM/NB/O | PM/NM/NS | PM/NS/NM | PS/NS/NM | O/O/NS | NS/PS/NS | NS/PS/O |
| O | PM/NB/O | PM/NM/NS | PS/NS/NS | O/O/NS | NS/PS/NS | NM/PM/NS | NM/PM/O |
| PS | PS/NS/O | PS/NS/O | O/O/O | NS/PS/O | NS/PS/O | NM/PM/O | NM/PB/O |
| PM | PS/O/PB | O/O/NS | NS/PS/PS | NM/PS/PS | NM/PM/PS | NM/PB/PS | NB/PB/PB |
| PB | O/O/PB | O/O/PM | NM/PS/PM | NM/PM/PM | NM/PM/PS | NB/PB/PS | NB/PB/PB |

Figure 5:
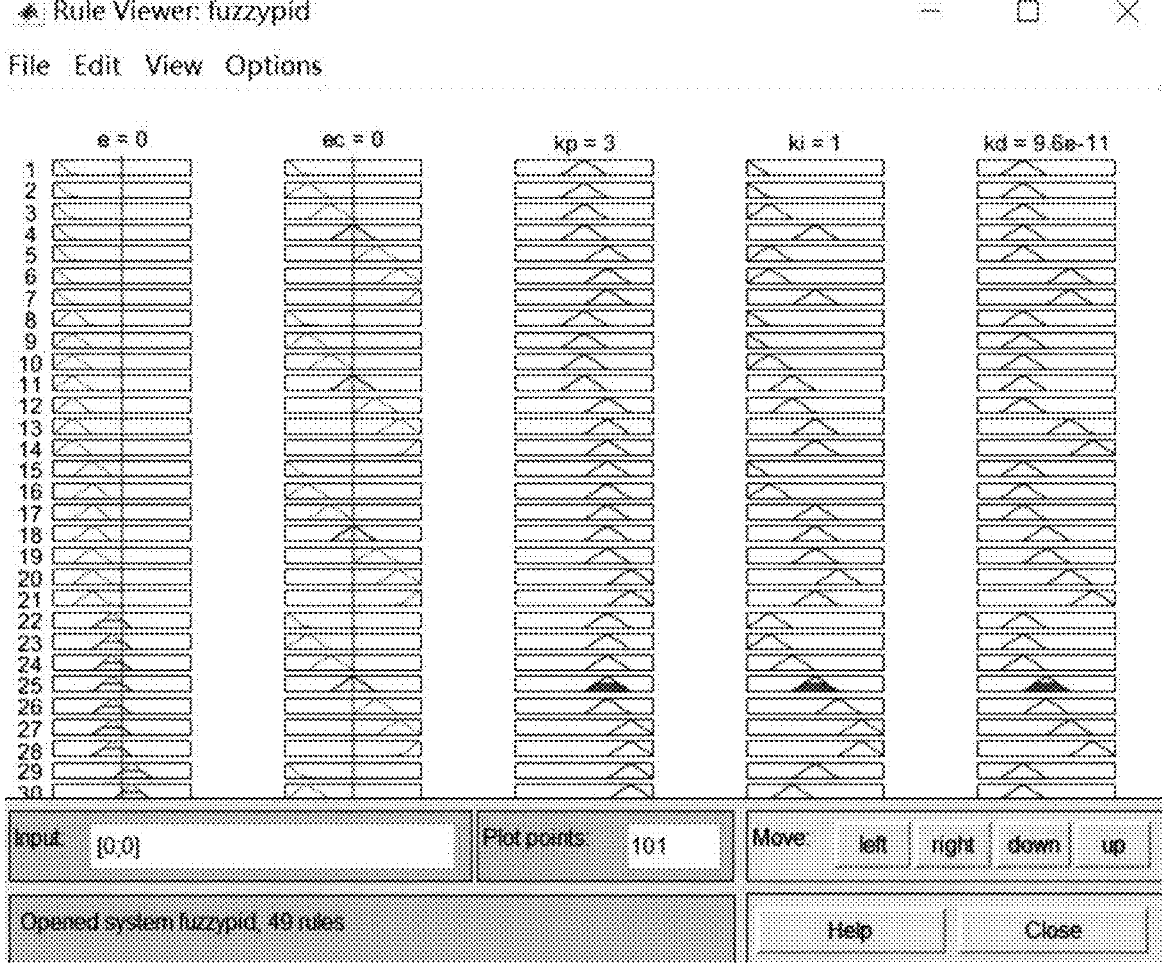
FIG. 5 is a schematic diagram of a fuzzy rule of a predictive fuzzy PID control method according to the present application.
Figure 6:
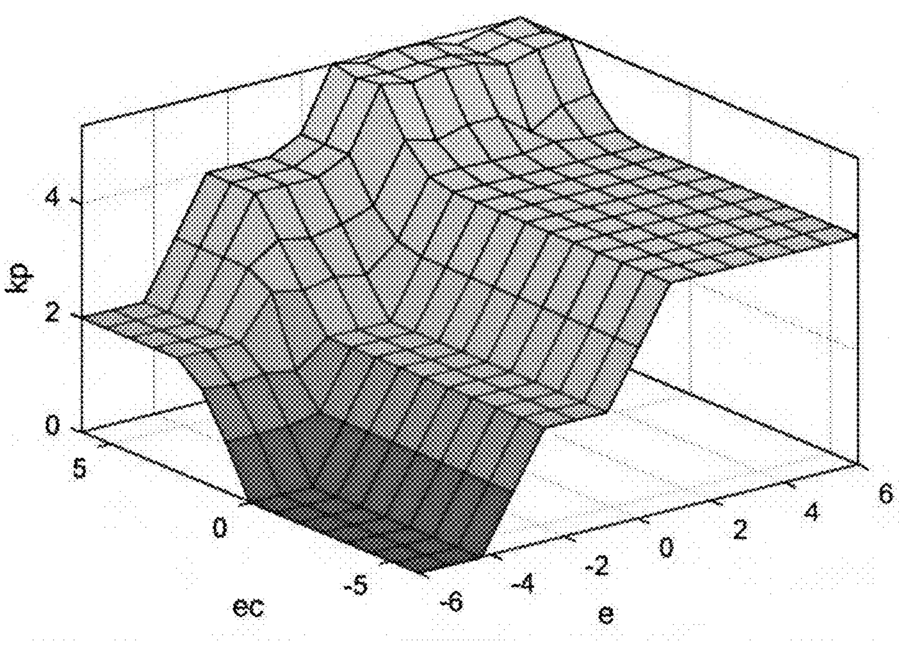
FIG. 6 is a schematic diagram of a Δkp characteristic surface of a predictive fuzzy PID control method according to the present application.
Figure 7:
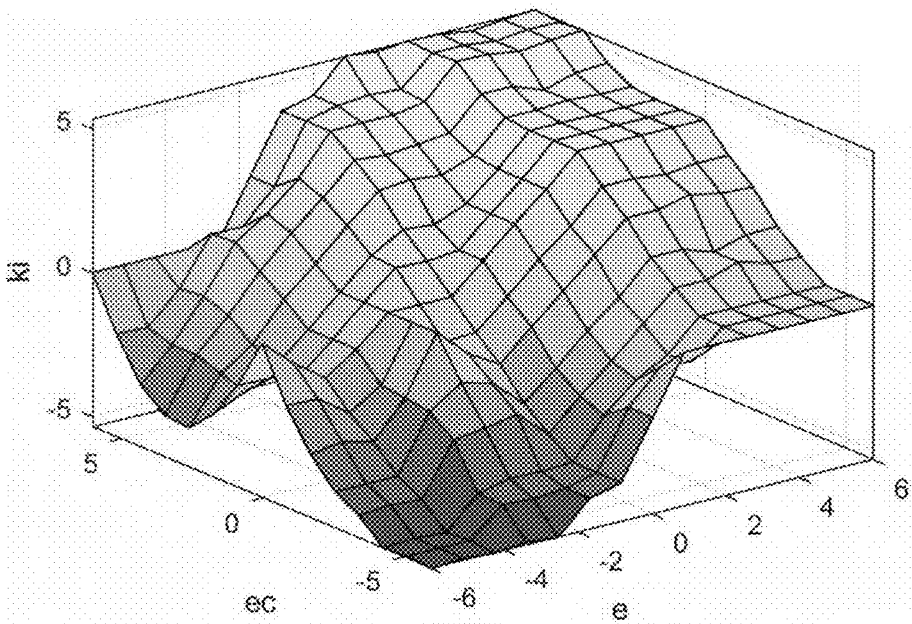
FIG. 7 is a schematic diagram of a Δki characteristic surface of a predictive fuzzy PID control method according to the present application.
Figure 8:
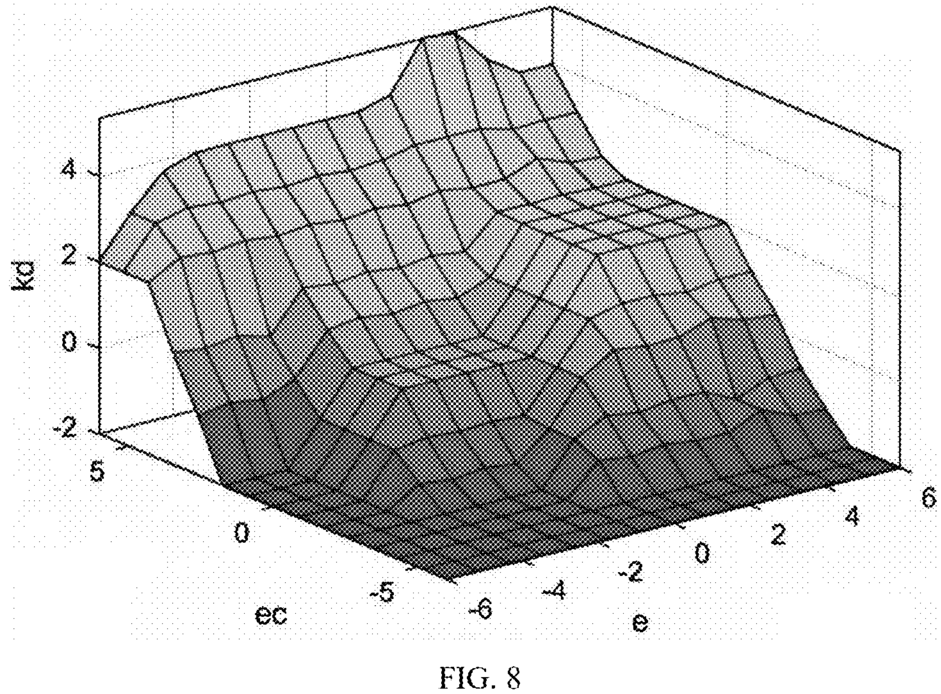
FIG. 8 is a schematic diagram of a Δkd characteristic surface of a predictive fuzzy PID control method according to the present application.

The fuzzy rules are set for $\Delta K_p$, $\Delta K_i$ and $\Delta K_d$ according to the control rules shown in the above table using a fuzzy rule editor in a fuzzy logic designer on Matlab software. The established fuzzy rule view is shown in FIG. 5, and the output characteristic surfaces of the fuzzy inference system are shown in FIGS. 6 to 8.

(4) Online Parameter Adjustment

According to the fuzzy control rules introduced above, $\Delta K_{p0}$, $\Delta K_{i0}$ and $\Delta K_{d0}$ are used as three reference parameters to adjust the parameters online. Specifically, after the deviation e and the deviation derivative ec are controlled for fuzzy processing, $\Delta K_p$, $\Delta K_I$ and $\Delta K_d$ are calculated according to the fuzzy control rule table, and are combined with the reference parameters $\Delta K_p$, $\Delta K_i$ and $\Delta K_d$ to obtain the final control parameters. The calculation is shown in formulas 2-13. This allows the PID controller to adapt to changes in real time during operation and maintain the stability and accuracy of the system.

$$\begin{cases} K_p = K_{p0} + \Delta K_p \\ K_i = K_{i0} + \Delta K_i \\ K_d = K_{d0} + \Delta K_d \end{cases}.$$

In summary, the main components of the fuzzy PID controller include:

Fuzzification of variables: Input variables and output variables are converted into fuzzy sets, and the actual input and output are mapped to the fuzzy sets by selecting appropriate membership functions and defining fuzzy subsets.

Knowledge base: A database that stores fuzzy rules and membership functions, including fuzzy rules for input variables and membership functions for output variables, used in fuzzy inference and decision-making processes.

Fuzzy inference: Based on fuzzy rules and the membership of input variables, the fuzzy set of output variables is determined by a fuzzy inference engine. The fuzzy inference includes two steps, matching and synthetic inference, which are used to calculate the fuzzy set of output variables.

Defuzzification: The fuzzy set is converted into a specific control signal, and the final control result is determined by methods such as maximum membership method, average method or centroid method.

Online parameter adjustment: Through a fuzzy control rule and a fuzzification result of the input variables, according to a preset benchmark parameter, parameters of the PID controller in real time are adjusted to adapt to different control requirements and changing environments.

Through the above components, the fuzzy PID controller may adjust the parameters of the PID controller in real time according to the input variables and preset fuzzy rules, thereby achieving precise control of the controlled object. The fuzzy control method shows good control performance and adaptability in dealing with complex nonlinear systems and fuzzy changing environments.

Figure 3:
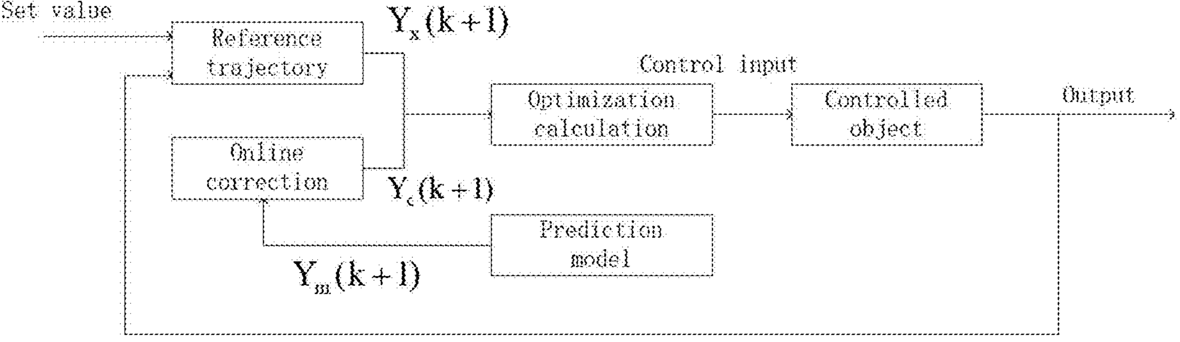
FIG. 3 is a schematic diagram of a predictive control structure of a predictive fuzzy PID control method according to the present application.

Predictive control is a control algorithm. The basic idea is to pay attention to the past state of the target while considering future targets, so as to minimize the deviation between the controlled quantity and the target value, thereby improving the control performance of the system. Predictive functional control is a relatively new predictive control algorithm, which introduces the concept of basis function to improve control regularity, response speed and accuracy, while maintaining the advantages of model control. The predictive control principle is shown in FIG. 3.

The predictive functional control implements predictive control based on elements, the elements include a basis function, a reference trajectory, a predictive model, feedback correction and rolling optimization, the basis function provides a basis for expression of a control strategy, the reference trajectory indicates a control objective, the predictive model performs future state prediction, the feedback correction corrects a prediction error, and the rolling optimization continuously adjusts the control strategy based on real-time information.

(1) Basis Function

Predictive functional control (PFC) considers the newly added control action as a linear combination of several known basis functions, the output of which is a weighted combination of the above basis functions to the changes in the object's response [23]. The form of the basis function can be arbitrary, such as, polynomial, trigonometric function, and Gaussian function. The selection of basis functions should be based on the actual situation of the controlled object to achieve the optimal prediction effect. The predictive functional control predicts future deviations based on the established dynamic model and corrects the current control strategy through a feedback mechanism to achieve precise control of the controlled object. The predictive functional control has the advantages of strong adaptability, good stability and high robustness, and has been widely used in industrial control systems.

$$u(K+i) = \sum_{j=1}^{N} \mu_j(K) f(i) \tag{2-1}$$

Formula (2-1) indicates that the order N of the basis function may be determined based on the tracking set value and the process model. The linear combination weight coefficients $u_j(k)$ of the basis functions need to be optimized. $f_j(i)$ represents the value of the basis function at the i-th sampling period. When the commonly used basis function forms—step, ramp and parabola are adopted, values of the basis functions in each sampling period is represented as: a step function $f_j(i)$=step(i-k), a ramp function $f_j(i)$=max(0, i−k), and a parabola function $f_j(i)=\max(0,(i-k)^2)$, wherein k is a center position of the basis function. The value of the basis functions is as follows:

$$f_j(i) = F(i, j) \tag{2-3}$$

wherein S is a number of fitting points, $h_s$ is an s-th fitting point moment, and F takes a sampling period T as a unit.

(2) Reference Trajectory

To ensure that the system output can reach the preset value in a stable and orderly manner, a reference trajectory method is proposed to limit and adjust the system output value by comparing the difference between the predicted output value and the actual process output value, so as to ensure that the system output can effectively approach the preset value and remain stable. This reference trajectory may take the form of a first order exponential, and a trace step set value is used herein, that is, a slowly increasing trend that sets the reference trajectory to gradually approach a future predetermined value. Precise control of the reference trajectory may effectively match the input and output in a multivariable system, thereby achieving precise control objectives. The reference trajectory at a moment k+i may be represented as:

$$Y_r(k+i)=C(k)-\lambda^I(C(k)-Y_p(k))$$

$$C(K)=[c_1(k),\ldots,c_n(k)]^T$$

$$\lambda^I=e\frac{-T_s}{T_m}$$

$$Y_P(K)=[y_{p1}(k),\ldots\ldots,y_{pn}(k)]^T$$

wherein C(k) is a set value at a moment K, $T_s$ is a sampling time, $T_m$ is a desired reaction time of a reference trajectory n, and $Y_p$(K) is an actual output of an n-th input at the moment K.

(3) Model Prediction of Dynamic Matrix

Compared with traditional control methods based on transfer function or state-space model parameter identification, the dynamic matrix control (DMC) algorithm does not require these steps. The algorithm takes the response of the controlled object to a step signal as input, and the time lag problem of system process control is often solved by multi-step prediction technology. The dynamic matrix control controls linear objects more accurately and gradually, and achieves stability by predicting the error between the output value and the reference value through quadratic performance indicators during control. Therefore, the DMC algorithm may be called an optimal control technique.

In DMC control, the sampling value a=a(iT) of the controlled object for a unit step signal has a sampling number set to i and a sampling period set to T. If the object is asymptotically stable, the response state of the object tend to be stable after tN=NT (a certain moment), so when i>N, the sampling value ai is similar to the steady-state value as=a(∞) of the step response. The finite set {a1, a2, . . . aN} is used to approximately describe the dynamic information of the object. The parameters of this set constitute the model parameters of the DMC algorithm. The model vector is a=[a1,a2, . . . aN]T, and the length of the modeling domain is N. The simulation program is used to determine the optimization program and calculate the control coefficients d1 . . . dp.

The model parameters {$a_i$} of the system are used to predict an output value of the object in the future. The output value formula at future moment is:

$$\tilde{y}_1\left(k+\frac{i}{k}\right)=\tilde{y}_0\left(k+\frac{i}{k}\right)+a_i\Delta u(k),\quad i=1,\ldots,N \tag{2-5}$$

wherein $$\tilde{y}_0\left(k+\frac{i}{k}\right)$$

is the output at a moment k (assuming the control effect remains unchanged) using the initial prediction to predict the output at the next N moments.

under the action of M continuous control increments Δu (k), . . . , Δu (K+M−1), an output value at each moment in the future is predicted:

$$\tilde{y}_m\left(k+\frac{i}{k}\right)=\tilde{y}_0\left(k+\frac{i}{k}\right)+\sum_{j=1}^{min(M,i)}a_{i-j+1}\Delta u(K+M-1),\ i=1,\ldots,N \tag{2-6}$$

wherein y is a number of times the control quantity changes, and $$\left(k+\frac{i}{k}\right)$$

is a predicted value at the moment k to the moment k+i.

(4) Rolling Optimization of Dynamic Matrix

The goal of the dynamic matrix algorithm is to start at any moment k, and the next M control increments Δu(k), . . . , Δu(k+M−1) are determined, so that the output prediction value $\tilde{y}_M$ (k+i/k) of the controlled object at the next P moments under control is as close as possible to the given expected value ①(k+i). In this process, the control domain and the optimization domain are represented by M and P respectively. At the moment k, the control effect of the system may be evaluated as a whole using the optimization performance index.

$$\min J(k)=\sum_{i=1}^{P}qi\left[\omega(k+i)-\frac{\tilde{y}_M(k+i)}{k}\right]^2+\sum_{j=1}^{M}\tau_j\,\Delta u^2(k+j-1) \tag{2-7}$$

The qi and τj are weight coefficients, which are used to suppress tracking errors and control quantity changes. In the dynamic matrix algorithm, these weight coefficients are used to adjust the optimization performance indicators of the system, so that the system may track the expected output value more stably and accurately, and minimize the change of the control amount.

Without considering any constraints, the prediction model may be used to derive the relationship between y and Δu in the performance indicator.

$$\tilde{y}_{PM}(k)=\tilde{y}_{P0}(k)+A\Delta u_M(k) \tag{2-8}$$

The dynamic matrix A is associated with the prediction model and consists of a matrix of P rows and M columns with step response coefficients ai. At the moment k, given $\omega_p$ (k), $\tilde{y}_{p0}$ (k), $$\frac{dJ(k)}{d\Delta uM(k)}=0,$$

as ΔuM(k) that minimizes J(k), can be obtained through the necessary conditions for the extreme value:

$$\Delta u_M(k)=\left(A^TQA+R\right)^{-1}A^TQ\left[①_p(k)-\tilde{y}_{P0}(k)\right] \tag{2-9}$$

The dynamic matrix A is not regarded as a solution that needs to be implemented, but only as the value of the immediate control increment Δu(k), which is used to form the actual control signal Δu(k)=Δu(k−1)+Δu(k) to act on the object. With the "rolling optimization" strategy, the system raises a similar optimization problem at the next moment and solve a new optimal solution Δu(k+1). This process is repeated continuously, that is, the dynamic matrix algorithm optimization calculation is performed again at each moment to obtain the real-time optimal control increment value.

(5) Dynamic Matrix Feedback Correction

In practical applications, the predicted values obtained by the prediction model may deviate from the actual values due to various unknown factors such as model mismatch and environmental interference. Therefore, in the next optimization process, if modeling and optimization are performed based on the dummy information, the result is inaccurate. In the DMC algorithm, the actual output y(k+1) of the controlled object is obtained through actual measurement. The output of $\tilde{y}_1$ (k+1/k) predicted by the model is compared with the actual output to calculate the output error information. This output error information may be used to correct the model and adjust the optimization parameters to achieve more accurate control effects.

$$e(k+1) = y(k+1) - \tilde{y}_1\left(k + \frac{1}{k}\right) \tag{2-10}$$

wherein e(k+1) is the output error information, which may be used to predict future output errors and supplement the model prediction. The error is caused by the lack of causal description, so the time series method is used to predict the output error. A common approach is to weight e(k+1) and then use the corrected result to predict future outputs. This method can improve the control effect and make the model reflect the actual behavior of the controlled object more accurately. The output prediction vector may be represented as:

$$y_{cor}(k+1) = \tilde{y}_{N1}(k) + he(k+1) \tag{2-11}$$

$$y_{cor}(k+1) = \begin{bmatrix} \tilde{y}_{cor}\left(\frac{K+1}{k+1}\right) \\ \tilde{y}_{cor}\left(\frac{K+N}{k+1}\right) \end{bmatrix}. \tag{2-12}$$

wherein the corrected output prediction vector is $y_{cor}$(k+1), the N-dimensional vector h=[$h_1$ . . . $h_N$] composed of weight coefficients is called the correction vector.

It should be noted that, in the present application, relational terms such as "first" and "second" are merely used to distinguish one entity or operation from another entity or operation without necessarily requiring or implying any actual relationship or order between such entities or operations. Moreover, terms "include", "comprise", or any other variants thereof are intended to cover a non-exclusive inclusion, so that a process, a method, an article, or a device that includes a list of elements includes those elements, and also includes other elements which are not expressly listed, or further includes elements inherent to this process, method, article, or device.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

Various embodiments of the present application have been described above. The above description is exemplary, not exhaustive, and is not limited to the disclosed embodiments. Many modifications and variations are apparent to those of ordinary skill in the art without departing from the scope and spirit of the described embodiments. The terms used herein are selected to explain the principles of the embodiments, practical applications or improvements to the technology in the marketplace, or to enable others of ordinary skill in the art to understand the embodiments disclosed herein.

What is claimed is:

1. A predictive fuzzy proportional-integral-derivative (PID) control method for an intelligent greenhouse, applied to a predictive fuzzy PID controller, wherein the predictive fuzzy PID controller comprises a predictive functional control and a fuzzy PID controller, and comprising the following steps:

acquiring greenhouse real-time data, wherein the real-time data comprises temperature data and humidity data;

obtaining fuzzy quantity, control quantity and error data based on the real-time data, wherein the error data comprises an error value and an error change rate;

obtaining a target value based on the error data and the predictive functional control;

controlling the target value and the error data for fuzzy inference, determining and adjusting parameters, and generating a control signal based on the parameters; and controlling adjustment of a greenhouse device based on the control signal to enable an output value of the greenhouse device to approach the target value, and repeating the above steps to achieve continuous greenhouse environment control.

2. The predictive fuzzy PID control method according to claim 1, wherein the fuzzy PID controller comprises:

variable fuzzification, configured to convert input variables and output variables into fuzzy sets, wherein the fuzzy sets comprise "low temperature", "moderate temperature", "high temperature", "low humidity", "moderate humidity" and "high humidity";

a knowledge base, configured to store a fuzzy rule and a membership function and provide support for the fuzzy inference;

the fuzzy inference, configured to, based on the fuzzy rules and a membership of the input variables, determine a fuzzy set of the output variables by a fuzzy inference engine, and calculate a fuzzy set of the output variables;

a defuzzification interface, configured to, based on a maximum membership method, convert the fuzzy set of the output variables into a specific control signal, wherein the specific control signal is configured to control devices of the intelligent greenhouse; and online parameter adjustment, configured to, through a fuzzy control rule and a fuzzification result of the input variables, according to a preset benchmark parameter, adjust parameters of the PID controller in real time to adapt to different control requirements and changing environments.

3. The predictive fuzzy PID control method according to claim 1, wherein the predictive functional control implements predictive control based on elements, the elements comprise a basis function, a reference trajectory, a predictive model, feedback correction and rolling optimization, the basis function provides a basis for expression of a control strategy, the reference trajectory indicates a control objective, the predictive model performs future state prediction, the feedback correction corrects a prediction error, and the rolling optimization continuously adjusts the control strategy based on real-time information.

4. The predictive fuzzy PID control method according to claim 1, wherein in the determination and adjustment of the parameters, the parameters are PID parameters, and a principle of the PID parameters is: determining a proportional gain, an integral gain, and a differential gain according to a size of the error, a size of an error change rate and a system requirement.

5. The predictive fuzzy PID control method according to claim 1, wherein the controlling the target value and the error data for fuzzy inference is implemented based on a fuzzy rule, and the fuzzy rules constitute a fuzzy rule control table based on a basic control criterion, a PID parameter self-tuning rule, and expert experience.

* * * * *